US012378822B2

(12) United States Patent
Stone

(10) Patent No.: US 12,378,822 B2
(45) Date of Patent: Aug. 5, 2025

(54) SAFETY ATTACHMENT FOR LADDERS

(71) Applicant: Tony Stone, Hesperia, CA (US)

(72) Inventor: Tony Stone, Hesperia, CA (US)

(73) Assignee: Tony Stone, Hesperia, CA (US)

( * ) Notice: Subject to any disclaimer, the term of this patent is extended or adjusted under 35 U.S.C. 154(b) by 1007 days.

(21) Appl. No.: 17/467,094

(22) Filed: Sep. 3, 2021

(65) Prior Publication Data

US 2023/0070052 A1 Mar. 9, 2023

(51) Int. Cl.
*E06C 1/12* (2006.01)
*E06C 7/18* (2006.01)

(52) U.S. Cl.
CPC .............. *E06C 7/188* (2013.01); *E06C 1/125* (2013.01)

(58) Field of Classification Search
CPC ... E06C 1/12; E06C 1/125; E06C 7/06; E06C 7/10; E06C 7/18; E06C 7/188; E06C 7/42; E06C 7/423
See application file for complete search history.

(56) References Cited

U.S. PATENT DOCUMENTS 5,078,231 A * 1/1992 Davis ........................ E06C 7/42 D25/68
5,890,560 A * 4/1999 Sloop ........................ E06C 1/34 182/206
6,053,284 A * 4/2000 Fountain ................... E06C 7/42 182/180.2
6,089,350 A * 7/2000 Hankins .................... E06C 7/46 182/129
D733,325 S * 6/2015 Robinson, Jr. ................. D25/68
9,771,756 B1 * 9/2017 Gregoire ................... E06C 7/42
10,619,416 B1 * 4/2020 Snell ......................... E06C 7/06
2008/0185225 A1 * 8/2008 Spengler ................. E06C 7/423 182/172
2011/0114418 A1 * 5/2011 Blazin ....................... E06C 7/06 182/129
2011/0290587 A1 * 12/2011 Blazin ..................... E06C 7/188 182/107
2016/0153234 A1 * 6/2016 Mazanek ................ E06C 7/188 248/354.1
2017/0198522 A1 * 7/2017 Stewart ..................... E06C 7/42
(Continued)

FOREIGN PATENT DOCUMENTS

GB 2172044 A * 9/1986 ............... E06C 7/42
GB 2207176 A * 1/1989 ............... E06C 7/42
GB 2330612 A * 4/1999 ............... E06C 7/42
(Continued)

*Primary Examiner* — Ryan D Kwiecinski
(74) *Attorney, Agent, or Firm* — Elizabeth Yang

(57) ABSTRACT

A safety attachment which is used to stabilize a straight ladder or an extension ladder, comprising: a main body, which contains an upper portion and a lower portion, the upper portion and the lower portion are connected to each other; the upper portion can be attached to the ladder, and the lower portion can stably contact ground surface; a plate, which is fixed on the main body, and a first loop is fixed on the plate; and at least one rope, which has one connector located on both ends of the rope respectively, and one of the connectors is used to detachably attach to the first loop to let the rope connect to the main body, another one of connectors is used to detachably attach to a second horizontal bar on the ladder to let the rope connect to the ladder.

13 Claims, 8 Drawing Sheets

(56) References Cited

U.S. PATENT DOCUMENTS

| | | | | |
|---|---|---|---|---|
| 2021/0180404 | A1 * | 6/2021 | Gerbrandt | E06C 7/423 |

FOREIGN PATENT DOCUMENTS

| | | | | | |
|---|---|---|---|---|---|
| GB | 2332697 | A | * | 6/1999 | B66F 7/243 |
| GB | 2344611 | A | * | 6/2000 | E06C 7/423 |
| GB | 2443827 | A | * | 5/2008 | E06C 7/423 |
| GB | 2445359 | A | * | 7/2008 | E06C 7/42 |
| GB | 2562743 | A | * | 11/2018 | E06C 7/188 |
| WO | WO-03080984 | A1 | * | 10/2003 | E06C 7/42 |
| WO | WO-2017027911 | A1 | * | 2/2017 | E06C 1/10 |
| WO | WO-2023070148 | A1 | * | 5/2023 | E06C 7/42 |

* cited by examiner

SAFETY ATTACHMENT FOR LADDERS

FIELD OF THE INVENTION

The present invention relates generally to a safety attachment for use with an existing ladder, and more particularly, the present invention discloses a safety attachment set for use with either of straight or extension ladders to provide an enhanced degree of anti-rocking support to the ladder, which makes the ladder far safer, and the safety attachment is easy to use. These features further resulting in peace of mind to a user supported upon an elevated step location of the ladder.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Nowadays, straight and extension ladders usually are configured for leaning against a fixed structure, such as an exterior wall of a building.

Firefighters, carpenters, house painters often require the use of such ladders are well aware of the hazards created when a ladder must be leaned against a wall or other similar surface for stability. Take firefighters as an example, the angle at which a ladder must be erected is determined by limitations of available space or by the firefighter's need to stand near the top of the ladder rather than any considerations of stability or safety. In such situations, the ladder becomes less stable as the firefighter mounts higher. In the course of using tools or other devices, the firefighter may shift his weight enough to cause the base of the ladder to break contact with the ground or slide along the ground, allowing the ladder to slip and fall. Serious injury often accompanies such accidents, not only from striking the ground, but from being struck by tools or materials as they fall from the ladder.

The traditional solution for prevent the firefighter from falling is to always have an additional firefighter to stand beside the ladder to act as a spotter or a protector to stabilize the ladder. However, situations that require firefighters to be dispatched are usually urgent. At this time, everyone will be busy and there may be insufficient personnel. If one firefighter needs to be sent to stabilize or guard the ladder, it will make the shortage of personnel even worse, which will affect efficiency of firefighting or rescue.

Therefore, how to make the ladder more stable and safer in use without needing another person to stabilize or guard the ladder is the main problem that the applicant wants to solve.

SUMMARY

In order to solve the problem above, the present invention provides a safety attachment, which can effectively stabilize the ladder during use by preventing shifting or sliding of the base of the ladder, and it is also easy and quick for attaching to the ladder.

A safety attachment (also called T-SPOT) which is used to stabilize a straight ladder or an extension ladder, comprising:

a main body, which contains an upper portion and a lower portion, the upper portion and the lower portion are connected to each other; the upper portion has two connecting bars that parallel to each other, and a hook is fixed to an end of the connecting bars respectively to let the upper portion can be attached to a first horizontal bar on the ladder, which is used to step on; the lower portion has two stabilizing bars, and a stabilizer is attached on an end of the stabilizing bars respectively to let the lower portion can stably contact ground surface;

a plate, which is fixed on the main body, and covers a portion of surface of both the upper portion and the lower portion, and a first loop is fixed on the plate; and at least one rope, which has one connector located on both ends of the rope respectively, and one of the connectors is used to detachably attach to the first loop to let the rope connect to the main body, another one of connectors is used to detachably attach to a second horizontal bar on the ladder to let the rope connect to the ladder.

In another aspect, an elongate arm coupled to the elongate post, the elongate arm is for coupling a mail box thereto.

In another aspect, the indicium cutouts arranged vertically on the surface of the elongate post.

In some embodiments, the first loop is located at the location on the plate which corresponding to center of outer surface of the main body.

In some embodiments, the main body further comprising second loops, the second loops are located on same side of the main body with the first loop, and the first loop is located at the location on the plate which corresponding to center of outer surface of the main body, and the second loops are located at outer surface of the stabilizing bars respectively.

In addition, the amount of the rope is corresponding to the amount of the first loop and the second loops, and one of the ropes has one end detachably attaches to the second horizontal bar, another end detachably attaches to the first loop, and each of the other ropes have one end detachably attaches to a third horizontal bar on the ladder, another end respectively and detachably attaches to the second loops.

In another aspect, each of the connectors contains a first lock structure to prevent the connectors to easily disconnect with the first loop, the second loops, the second horizontal bar and/or the third horizontal bar.

In another aspect, each of the hooks contains a second lock structure to prevent the hooks to easily disconnect with the first horizontal bar.

In another aspect, the stabilizers are rubbers, which cover the end of the stabilizing bars, or sharp objects which are used to insert into the ground surface for stabilizing the main body.

Furthermore, when the stabilizers are the sharp objects, the safety attachment further comprise a protective cover to cover each of the sharp objects to prevent the sharp objects cause damage to other structure or people.

In another aspect, the present invention further comprising an alternative power source, which is installed in the elongate post and connected to the light source, or connected to the light source through a wire from outside the elongate post, to directly power the light source.

In another aspect, the main body and the plate are constructed of aluminum alloy 6063 or aluminum alloy 6061.

In another aspect, the first loop is constructed of aluminum.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
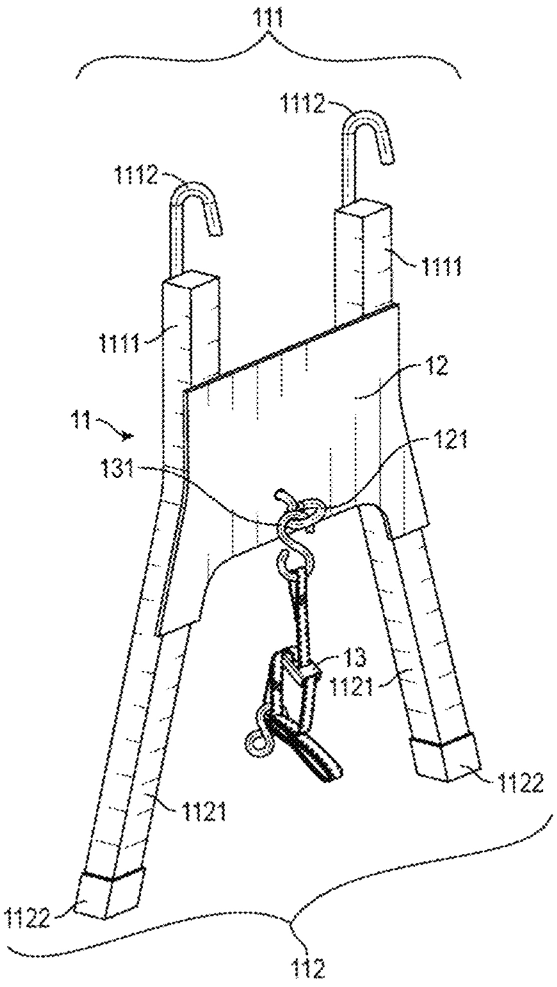
FIG. 1 shows a first embodiment of a safety attachment with only a first loop on it and the rope is attached to the first loop.
Figure 2:
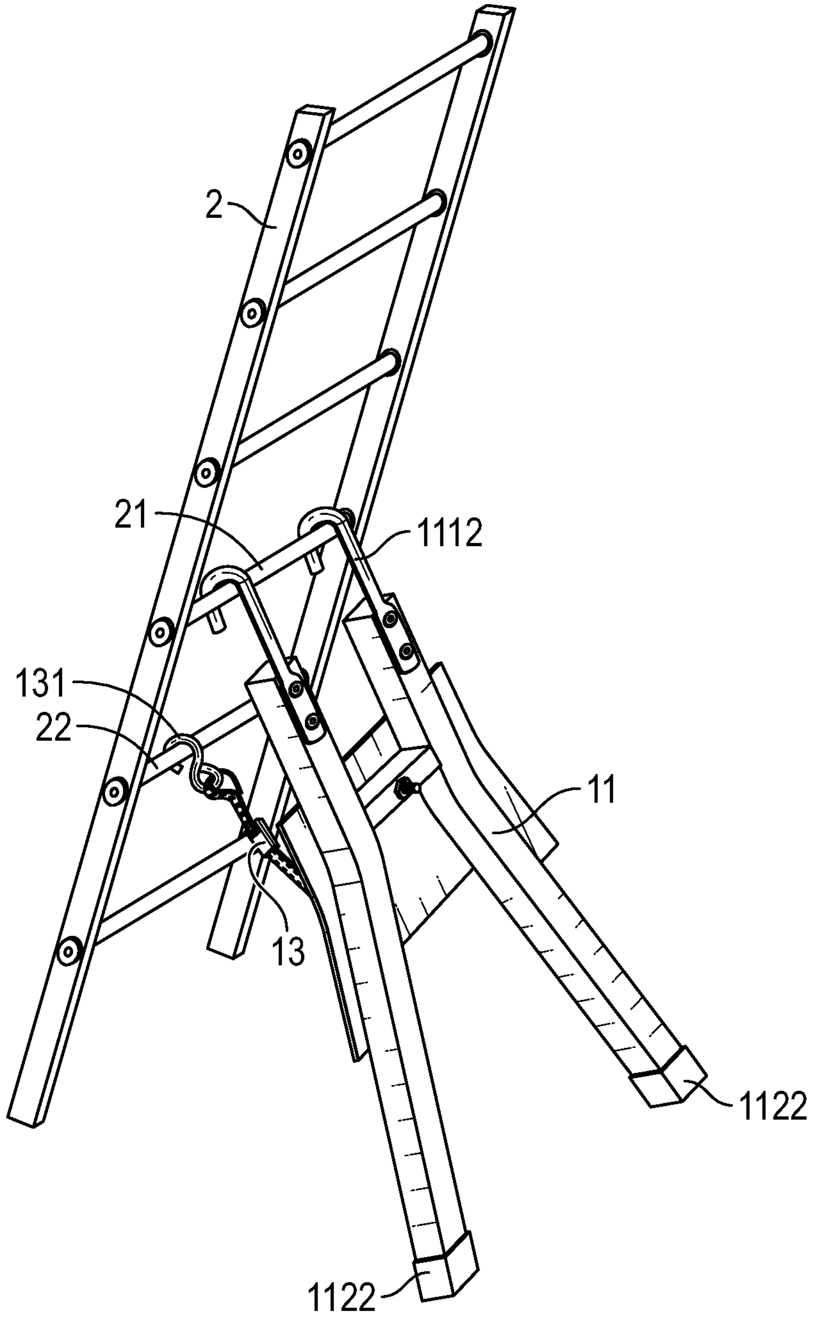
FIG. 2 shows how the safety attachment is attaching to the ladder in the first embodiment.

Please refer to FIGS. 1 & 2, they show a perspective view of a safety attachment in the first embodiment and how the safety attachment is attaching to the ladder in this embodiment. The safety attachment 1 (also called T-SPOT) which is used to stabilize a straight ladder 2 or an extension ladder 2, comprising:

a main body 11, which contains an upper portion 111 and a lower portion 112, the upper portion 111 and the lower portion 112 are connected to each other; the upper portion 111 has two connecting bars 1111 that parallel to each other, and a hook 1112 is fixed to an end of the connecting bars 1111 respectively to let the upper portion 111 can be attached to a first horizontal bar 21 on the ladder 2, which is used to step on; the lower portion 112 has two stabilizing bars 1121, and a stabilizer 1122 is attached on an end of the stabilizing bars 1121 respectively to let the lower portion 112 can stably contact ground surface;

a plate 12, which is fixed on the main body 11, and covers a portion of surface of both the upper portion 111 and the lower portion 112, and a first loop 121 is fixed on the plate 12; and at least one rope 13, which has one connector 131 located on both ends of the rope 13 respectively, and one of the connectors 131 is used to detachably attach to the first loop 121 to let the rope 13 connect to the main body 11, another one of connectors 131 is used to detachably attach to a second horizontal bar 22 on the ladder 2 to let the rope 13 connect to the ladder 2.

While using, firefighters only need to place the safety attachment 1 on the ground diagonally, and hang the hook 1112 on the step bar of the ladder 2, which has been set up, and then hang one end of the rope 13 on the first loop 121 and the other end on the other step bar, like shown in FIG. 2, firefighters can climb the ladder 2 steadily and safely without worrying that the ladder 2 will slide and cause themselves to fall and be injured, and they do not need the assistance of another firefighter to allow the firefighter working on other things to increase the efficiency of saving people or places. And, the first loop 121 is located at the location on the plate 12 which corresponding to center of outer surface of the main body 11. In this way, when the rope 13 is connected to the first loop 121 and the ladder 2, since the first loop 121 is located at the center of the main body 11, the main body 11 will not be easily pulled when the ladder 2 slips accidentally. In other embodiments, the first loop 121 may also be set in the main body's center of gravity to make the main body 11 less likely to be pulled, so as to improve the stability of the present invention. In some embodiments, the main body and the plate are constructed of aluminum alloy 6063 or aluminum alloy 6061, and the first loop is constructed of aluminum. This will make the life of the present invention longer, and can withstand higher weight, and the structural strength is also stronger compared to other materials.

In this embodiment, each of the stabilizing bars 1121 is connected to one of the connecting bars 1111 located on the same side, and there is an angle between the stabilizing bar 1121 and the connecting bar 1111, the angle is between 120 degrees and 180 degrees. The stabilizing bars 1121, which are in a different direction from the connecting bars 1111 and extend to the left and right sides, can further enhance the stability of the safety attachment 1 on the ground. In addition, in this embodiment, the stabilizers 1122 are rubbers, which cover the end of the stabilizing bars 1121 for stabilizing the main body 11. This can further reduce the possibility of the main body 11 sliding due to the influence of the ladder 2.

Figure 3:
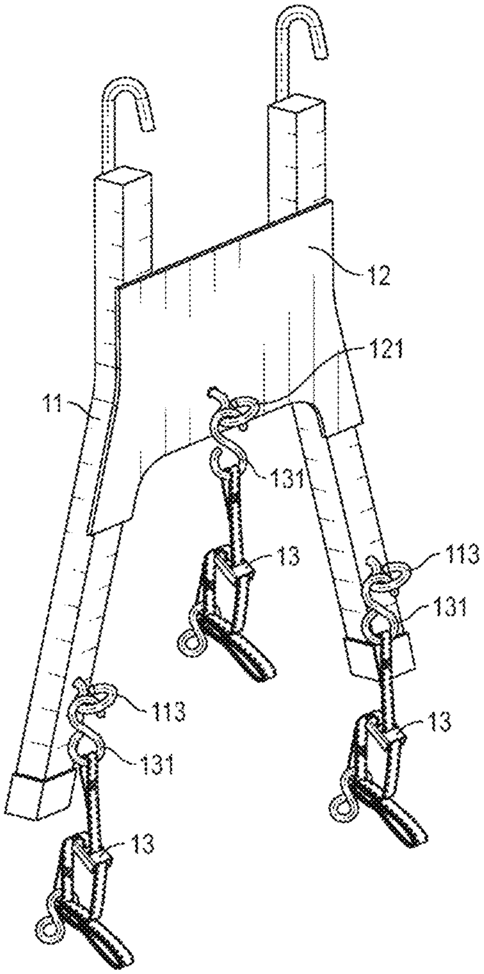
FIG. 3 shows a second embodiment of a safety attachment.
Figure 4:
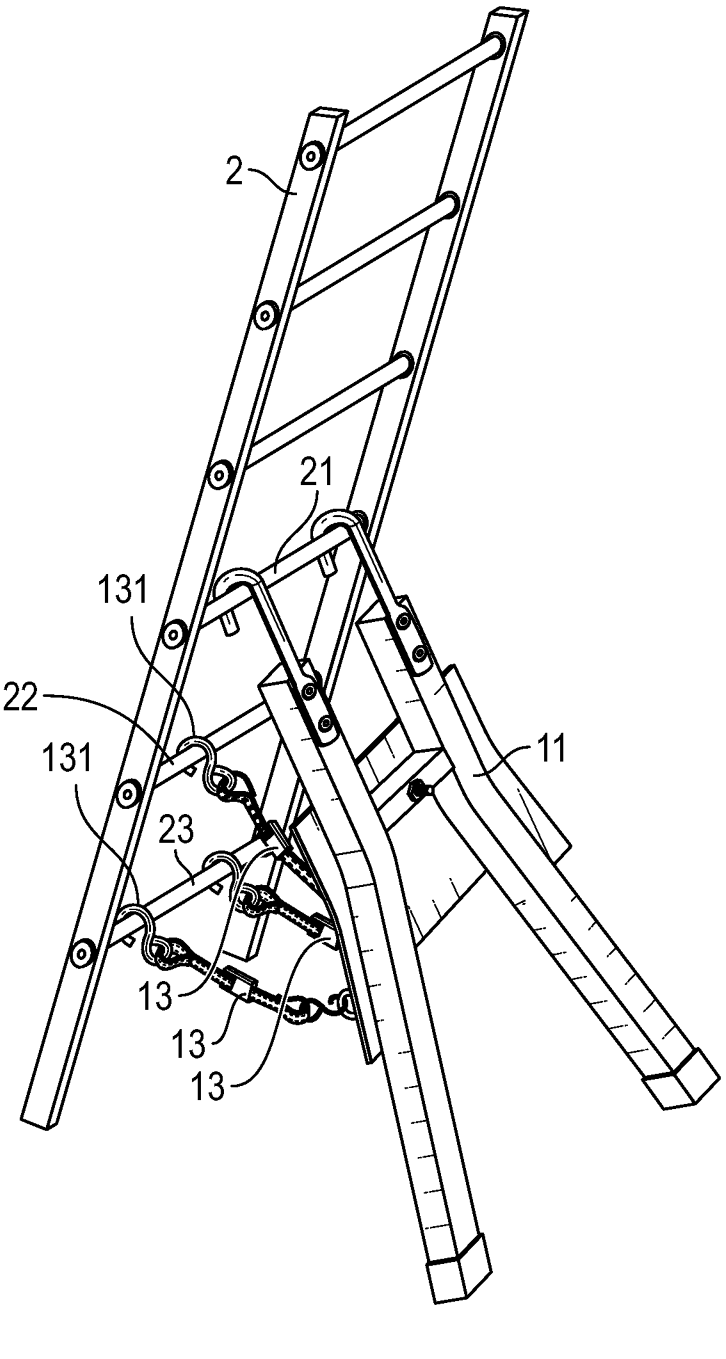
FIG. 4 shows how the safety attachment is attaching to the ladder in the second embodiment.

Please refer to FIGS. 3 & 4, they show a perspective view of a safety attachment in the second embodiment and how the safety attachment is attaching to the ladder 2 in this embodiment. Compared with the first embodiment, the main body 11 further comprises multiple second loops 113, the preferable amount would be two, the second loops 113 are located on the same side of the main body 11 with the first loop 121, and the first loop 121 is located at the location on the plate 12 which corresponding to center of outer surface of the main body 11, and the second loops 113 are located at outer surface of the stabilizing bars 1121 respectively in this embodiment. And, the amount of the rope 13 also increases with the amount of the first loop 121 and the second loops 113, and one of the ropes 13 has one end detachably attaches to the second horizontal bar 22, another end detachably attaches to the first loop 121, and each of the other ropes 13 have one end detachably attaches to a third horizontal bar 23 on the ladder 2, another end respectively and detachably attaches to the second loops 113. In this way, through the setting of the second loops 113, especially set at a lower position, and the connection of multiple ropes 13, the present invention will become more stable in use, as shown in FIG. 4.

Figure 5:
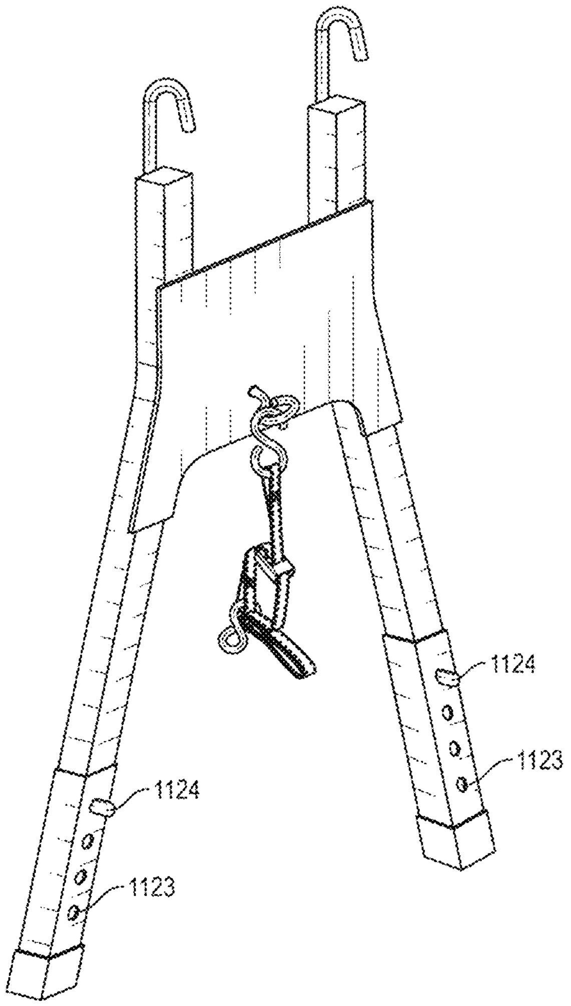
FIG. 5 shows a third embodiment of a safety attachment.

Please refer to FIG. 5, it shows a perspective view of a safety attachment in the third embodiment. Compared with other embodiments, the stabilizing bars 1121 in this embodiment can be extended and contracted to increase the length of the safety attachment 1 in response to the length increased of the ladder 2, so that the stability of the ladder 2 can be improved when the length of the ladder 2 becomes longer. In addition, when the stabilizing bars 1121 are stretched and retracted, elastic protrusions 1124 are engaged with one of multiple holes 1123 on the surface of the stabilizing bars 1121 to adjust the length of the stabilizing bars 1121. This setting allows users to quickly adjust the height, and the elastic protrusion 1124 and the hole 1123 are not easy to fall off after being engaged, which also shows how safety is emphasized in the present invention.

Figure 6:
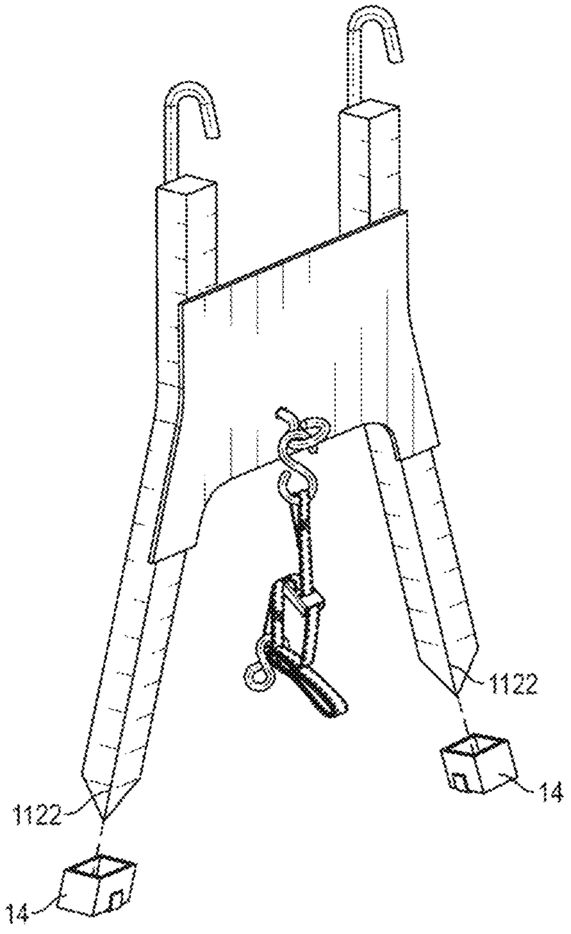
FIG. 6 shows a fourth embodiment of a safety attachment.

Please refer to FIG. 6, it shows a perspective view of a safety attachment in the fourth embodiment. Compared with other embodiments, the stabilizers 1122 are sharp objects which are used to insert into the ground surface for stabilizing the main body 11 in this embodiment. In this way, it can also have good stability on a relatively special terrain or ground. In addition, the safety attachment 1 further comprises a protective cover 14 to cover each of the sharp objects to prevent the sharp objects cause damage to other structures or people. While improving the stability, it also pays attention to the safety of the user during transportation or use.

Figure 7:
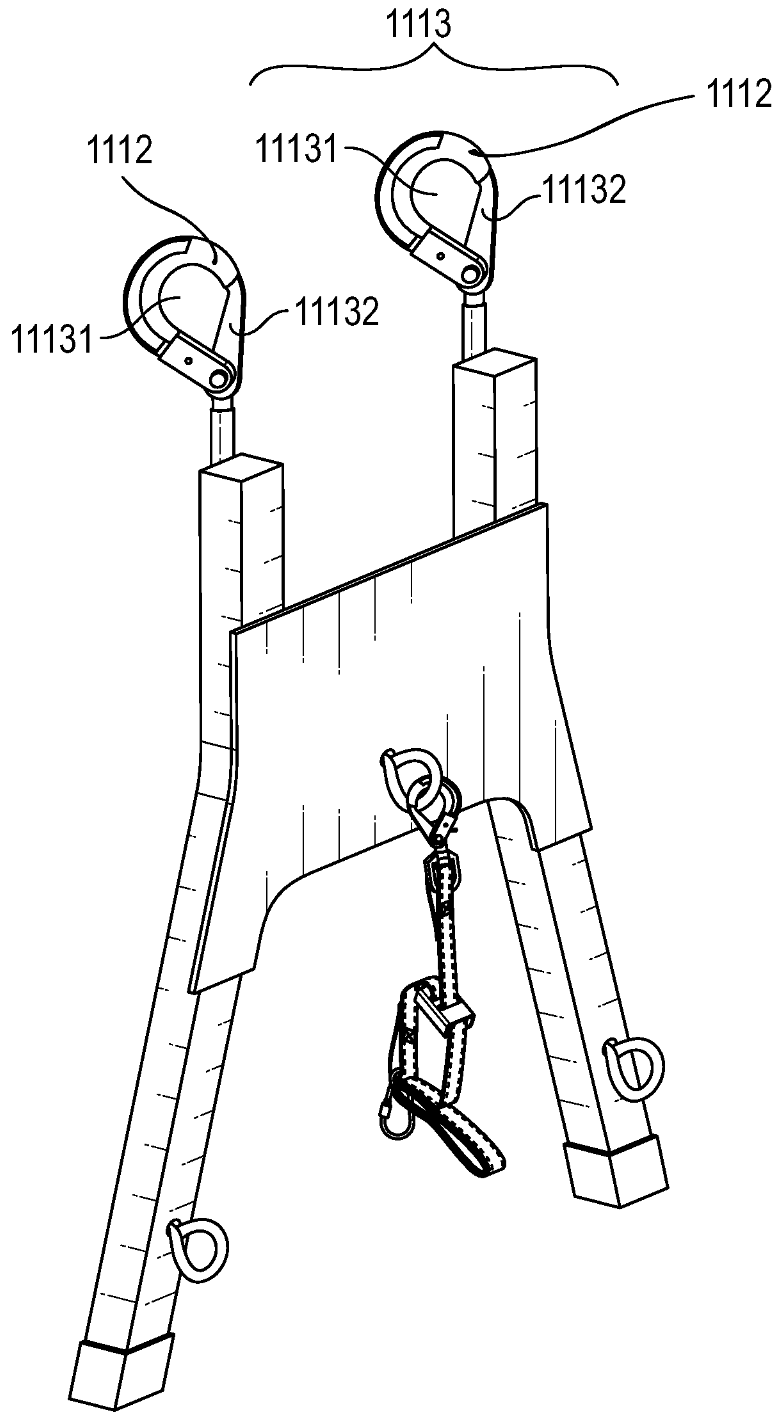
FIG. 7 shows the hook and the adjacent portion of the safety attachment in another aspect of implementation.

Please refer to FIG. 7, it shows a perspective view of the hook and the adjacent portion of the safety attachment in another aspect of implementation. In some embodiments, each of the hooks 1112 contains a second lock structure 1113 to prevent the hooks 1112 from easily disconnecting with the first horizontal bar 21. In detail, each of the second lock structures 1113 includes a second connecting space 11131 and a second barrier 11132. The second barrier 11132 has a limiting position function and is movably pivotally connected to the hook 1112 to open or close the second connecting space 11131. When the hooks 1112 are about to be connected to the first horizontal bar 21, the first horizontal bar 21 will press the second barrier 11132 to rotate inward, allowing the first horizontal bar 21 to enter the second connection space. After the first horizontal bar 21 enters the second connecting space 11131, the second barrier 11132 will return to its original position to place the first horizontal bar 21 in the second connecting space 11131, so as to prevent the present invention from being easily separated from the ladder 2. Also, it can quickly connect the present invention to the ladder 2, demonstrating both the safety and practicality of the present invention.

Figure 8:
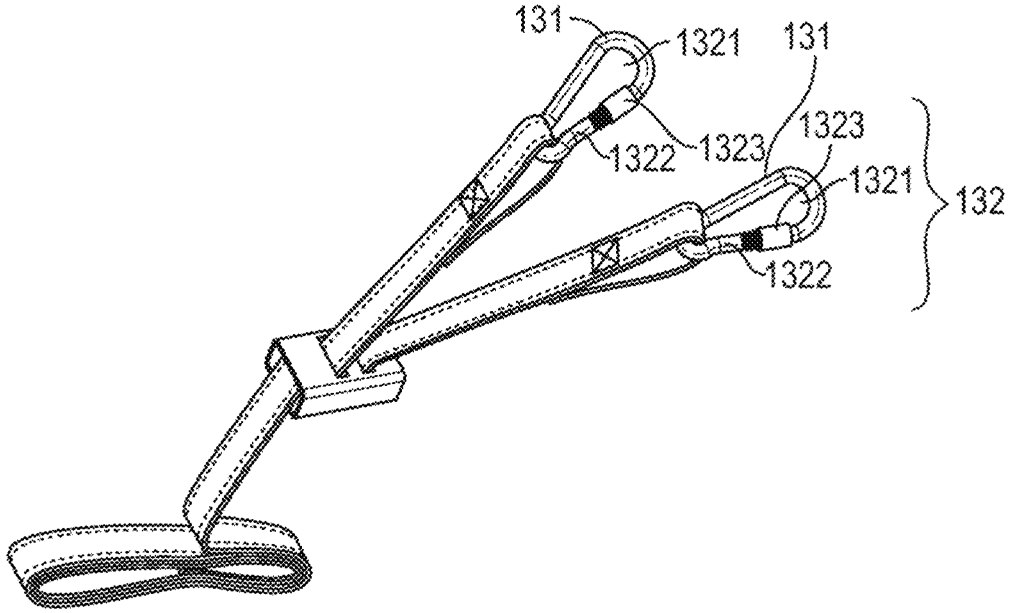
FIG. 8 shows the rope in another aspect of implementation.

Please refer to FIG. 8, it shows the rope in another aspect of implementation. In some embodiments, each of the connectors 131 contains a first lock structure 132 to prevent the connectors 131 from easily disconnecting with the first loop 121, the second horizontal bar 22, and/or the third horizontal bar 23. In detail, the first lock structure 132 includes a first connecting space 1321 and a first barrier 1322, the first barrier 1322 has a limiting position function and is movably pivotally connected to the connector 131, and the first barrier 1322 also has a fastening portion 1323, which is used to detachably attach the first barrier 1322 on the connector 131. Here, a rotary locking mechanism is used as an example, but it can also be fastened by other methods, so it is not limited to this implementation. While using, when one of the connectors 131 is about to be connected to the first loop 121, the second horizontal bar 22, and/or the third horizontal bar 23, the loop or horizontal bar will press the first barrier 1322 to rotate inward to allow the loop or horizontal bar to enter the first connection space. After the loop or horizontal bar enters the first connecting space 1321, the first barrier 1322 will return to its original position to place the loop or horizontal bar in the first connecting space 1321. At this time, the user can rotate the fastening portion 1323 so that the fastening portion 1323 will move upward to connect the first barrier 1322 and the connector 131, then restricts the mobility of the first barrier 1322, thereby avoiding the danger caused by the easy separation of the rope 13 and the ladder 2 or the rope 13 and the main body 11.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A safety attachment which is used to stabilize a straight ladder or an extension ladder, comprising:

a main body, which contains an upper portion and a lower portion, the upper portion and the lower portion are connected to each other; the upper portion has two connecting bars that parallel to each other, and a hook is fixed to an end of the connecting bars respectively to let the upper portion be attached to a first horizontal bar on the ladder, which is used to step on; the lower portion has two stabilizing bars, and a stabilizer is attached on an end of the stabilizing bars respectively to let the lower portion stably contact ground surface;

a plate, which is fixed on the main body, and covers a portion of surface of both the upper portion and the lower portion, and a first loop is fixed on the plate; and at least one rope, which has one connector located on both ends of the rope respectively, and one of the connectors is used to detachably attach to the first loop to let the rope connect to the main body, another one of connectors is used to detachably attach to a second horizontal bar on the ladder to let the rope connect to the ladder, wherein each of the connectors contains a first lock structure to prevent the connectors to easily disconnect with the first loop and the second horizontal bar, wherein each of the hooks contains a second lock structure to prevent the hooks to easily disconnect with the first horizontal bar.

2. The safety attachment of claim 1, wherein each of the stabilizing bars is connected to one of the connecting bars located on same side, and there is an angle between the stabilizing bar and the connecting bar, the angle is between 120 degrees and 180 degrees.

3. The safety attachment of claim 2, wherein the first loop is located at the location on the plate which corresponding to center of outer surface of the main body.

4. The safety attachment of claim 2, wherein the main body further comprising multiple second loops, the second loops are located on same side of the main body with the first loop, and the first loop is located at the location on the plate which corresponding to center of outer surface of the main body, and the second loops are located at outer surface of the stabilizing bars respectively.

5. The safety attachment of claim 4, wherein the amount of the rope is corresponding to the amount of the first loop and the second loops, and one of the ropes has one end detachably attaches to the second horizontal bar, another end detachably attaches to the first loop, and each of the other ropes have one end detachably attaches to a third horizontal bar on the ladder, another end respectively and detachably attaches to the second loops.

6. The safety attachment of claim 5, wherein each of the connectors contains a first lock structure to prevent the connectors to easily disconnect with the first loop, the second loops, the second horizontal bar and the third horizontal bar.

7. The safety attachment of claim 6, wherein each of the hooks contains a second lock structure to prevent the hooks to easily disconnect with the first horizontal bar.

8. The safety attachment of claim 7, wherein the stabilizers are rubbers, which covers the end of the stabilizing bars, or sharp objects which are used to insert into the ground surface for stabilizing the main body.

9. The safety attachment of claim 8, when the stabilizers are the sharp objects, the safety attachment further comprise a protective cover to cover on each of the sharp objects to prevent the sharp objects cause damage to other structure or people.

10. The safety attachment of claim 1, wherein the stabilizers are rubbers, which cover the end of the stabilizing bars, or sharp objects which are used to insert into the ground surface for stabilizing the main body.

11. The safety attachment of claim 10, when the stabilizers are the sharp objects, the safety attachment further comprise a protective cover to cover on each of the sharp objects to prevent the sharp objects cause damage to other structure or people.

12. The safety attachment of claim 1, wherein the main body and the plate are constructed of aluminum alloy 6063 or aluminum alloy 6061.

13. The safety attachment of claim 1, wherein the first loop is constructed of aluminum.

* * * * *